Patented Dec. 3, 1940

2,224,011

UNITED STATES PATENT OFFICE 2,224,011

PROCESS OF PREPARING DULCITOL AND MANNITOL MONOBORATE MONOCONDENSATION PRODUCTS

Clarence Bremer, Tamaqua, Pa., assignor to Atlas Powder Company, Wilmington, Del., a corporation of Delaware No Drawing. Application March 17, 1938, Serial No. 196,414

15 Claims. (Cl. 260—462)

This invention relates to a process of preparing dulcitol and mannitol monoborate monocondensation products and alkali metal (including ammonium) salts thereof.

The principal object of the invention is the production of dulcitol or mannitol monoborate monocondensation products and alkali metal salts thereof in a facile and economical manner.

A further object of the invention is the production of the foregoing monocondensation products from dulcitol and mannitol monoborate and diborate polycondensation products.

A still further object of the invention is the production of dulcitol or mannitol monoborate condensation products and alkali metal salts thereof, by a process which involves as an intermediate step the preparation of dulcitol or mannitol borate polycondensation products.

Another object of the invention is the production of non-hydrolyzing aqueous solutions of dulcitol or mannitol monoborate monocondensation products by the hydrolysis of dulcitol or mannitol polycondensation products.

A still further object of the invention is the production of dulcitol and mannitol monoborate monocondensation products in solid, crystalline form by a process which involves dissolution in water of dulcitol and mannitol monoborate and diborate polycondensation products to effect hydrolysis to the monoborate monocondensation product and effecting separation thereof in solid, crystalline form.

Other objects of the invention will more fully hereinafter appear.

This application is a continuation-in-part of my co-pending application Serial No. 149,839, filed June 23, 1937, disclosing and claiming dulcitol and mannitol borate condensation products and alkali metal salts thereof. In this application, I claim the method of preparing dulcitol and mannitol monoborate monocondensation products.

The products of the invention are suitable for use in coating compositions for paper and textiles; ingredients in cosmetics and hair waving compounds; ingredients in electrolytic condensers; ingredients in pharmaceutical preparations and adhesives, and for many other uses where adhesiveness, relatively high viscosity, good electrical conductivity, and resistance to hydrolysis are desirable.

In the preparation of dulcitol and mannitol monoborate monocondensation products and alkali metal salts thereof, in which the hydrogen atom of one secondary alcohol group of the hexahydric alcohol has been replaced with the boron radical —B(OH)R, where R is OH or OM, M being an alkali metal, the condensation of the hexahydric alcohol and the boron radical to form directly the stable monocondensation product is accomplished with greatest difficulty. Attempts to form a monocondensation product by heating the ingredients to drive off only one mol of water result either in failure to obtain a good yield of the desired monocondensation product or in the production of a mixture of polycondensation products and unreacted ingredients.

Now I have discovered that when the dulcitol or mannitol borate polycondensation products and alkali metal salts thereof, as set forth below and in my co-pending application referred to above, are hydrolyzed, the monoborate monocondensation products are produced. Thus, in the production of the monocondensation products in accordance with the present invention, the reaction of the ingredients is carried into the polycondensation stage and the polycondensation product hydrolyzed back to the monocondensation product, or if the polycondensation products are available, they may be hydrolyzed to form the monocondensation products. Where an aqueous medium is employed to effect hydrolysis, solutions of the stable monocondensation products may be obtained over a wide range of concentration and viscosity. Where the non-alkalized (acidic) monoborate monocondensation product is present in such solutions in sufficient proportion, it may be readily crystallized therefrom. The precipitated crystalline product may be removed from the solution in any desired manner, as by filtration, decantation, etc.

According to the preferred practice of the invention, there is prepared initially a water soluble derivative of a hexahydric alcohol selected from the group consisting of:—mannitol and dulcitol—in which the hydrogen atom of at least one secondary alcohol group has been replaced with a boron radical selected from that group of radicals represented by —BRR'; —BR'R², where R is OH or OM, M being an alkali metal, R' is a bond to the oxygen atom and replaces the hydrogen atom of another secondary alcohol group of the hexahydric alcohol, and R² is a bond to the oxygen atom and replaces the hydrogen atom of a third alcohol group of the hexahydric alcohol, the boron atom in said boron radical being bonded to the oxygen atom of at least two secondary alcohol groups of the hexahydric alcohol. This derivative is then hydrolyzed by an aqueous medium to form a stable water soluble derivative of the hexahydric alcohol in which the hydrogen atom of one secondary alcohol group has been replaced with the boron radical —B(OH)R, where R is OH or OM, M being an alkali metal.

One example of derivatives, from which the monocondensation product may be formed by the process of this invention, is mannitol monoborate dicondensation product of the following formula:

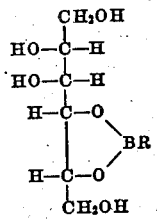

where R is OH or OM, M being an alkali metal.

Another example is mannitol diborate tetracondensation product of the following formula:

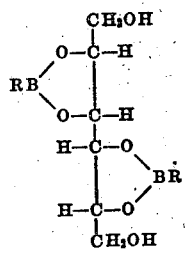

where R is OH or OM, M being an alkali metal.

Another example is dulcitol diborate tetracondensation product which, assuming transcondensation has taken place, has the following formula:

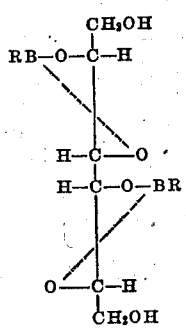

where R is OH or OM, M being an alkali metal.

Other examples are dulcitol monoborate dicondensation product having the empirical formula $C_6H_{12}O_6BR$, where R is OH or OM, M being an alkali metal, and dulcitol or mannitol monoborate tricondensation products having the empirical formula $C_6H_{11}O_6B$, the boron atom of the foregoing products being bonded to the oxygen atom of at least two secondary alcohol groups of the hexahydric alcohol.

In this specification, where pH of a product is referred to, unless otherwise designated, I mean the pH of a 25% aqueous solution prepared by dissolving 25 parts by weight of the product in 75 parts by weight of water.

The polycondensation products employed in the process may be either alkalized or non-alkalized. The non-alkalized polycondensation products are acidic in character and have a pH of about 2.0. The acidic products can be neutralized or made basic in character as desired by the addition thereto of alkalies, such as ammonium hydroxide, ammonia, sodium hydroxide, potassium hydroxide, lithium hydroxide, etc.; or the required amount of an alkali metal borate can be substituted for boric acid in the reaction mixture, thereby leading directly to the production of materials of the desired pH. The addition of about 0.75 to 0.80 mol of alkali per atom of boron in the hexitol borate will produce a product of pH 7 comprising a mixture of alkalized and non-alkalized borates, whereas the addition of one mol of alkali per atom of boron in the hexitol borate will produce a product consisting of the corresponding alkali salt having a pH value of about 10.6. For example, a neutral monoborate dicondensation product (pH of 7.0) may be prepared by reacting one mol of mannitol and one mol of boric acid and adding to the resinous melt 0.8 mol of sodium hydroxide per mol of mannitol. However, if one mol of sodium hydroxide is added to the resinous melt, the pH will be 10.6, which is the pH value of sodium mannitol monoborate dicondensation product. A neutral diborate tetracondensation product of pH 7 may be prepared by reacting one mol of mannitol and two mols of boric acid and adding to the resinous melt 1.5 mols of sodium hydroxide which is equivalent to 0.75 mol of sodium hydroxide per atom of boron. Furthermore, if two mols of sodium hydroxide are added to this resinous melt, the pH will be 10.6.

Clear, resin-like polycondensation products employed in the process may be obtained by reacting one mol of dulcitol or mannitol with from one to two mols of boric acid. The reaction of mol for mol ratios results in the production of dulcitol or mannitol monoborate dicondensation products when two mols of water have been split off, whereas the reaction of one mol of the hexahydric alcohol with two mols of boric acid results in the formation of dulcitol or mannitol diborate tetracondensation products when four mols of water have been split off.

In the preparation of the polycondensation products, the ingredients are preferably dissolved in a relatively large amount of water, say from 4 to 12 mols of water per mol of dulcitol or mannitol present in the reaction mixture. The use of such an amount of water is advantageous since it serves as a vehicle and facilitates mixing and reaction of the ingredients. The mixture thus obtained is then heated, preferably at a temperature of 115 to 120° C., for a sufficient period of time to drive off the water which must be removed to form the desired polycondensation product. Thus, with a mixture of one mol of mannitol, one mol of boric acid and 10 mols of water, removal from the reaction mixture of about 12 mols of water results in the production of mannitol monoborate dicondensation product. While the use of an excess of water is referred to above, it is to be understood that where the mixed melting point of the ingredients is below the charring point, the water of solution may be reduced in amount or eliminated completely.

In the preparation of dulcitol or mannitol borate polycondensation products having a pH value above 2.0, I find it preferable to react the hexahydric alcohol and the boric acid first, and to add at the end of the reaction the amount of alkali metal hydroxide required to adjust the melt to the desired pH. When the alkali metal is present from the beginning of the reaction, the reaction must be carefully controlled as there is a tendency for the reaction product to become charred or discolored, whereas when it is added after the reaction between the hexahydric alcohol and the boric acid, especially if the hexahydric alcohol borate melt is permitted to cool to about 100° C. before addition of the alkali metal hydroxide, this difficulty is minimized.

It is to be understood, however, that the alkali metal hydroxide may be employed as a starting material in the reaction mixture used to produce the polycondensation products employed in the present invention, or the alkali metal salts of boric acids, such as ammonium borate, sodium metaborate, sodium tetraborate, sodium perborate, potassium metaborate, potassium tetraborate, lithium metaborate, lithium tetraborate, and the like, may be employed in place of all or part of the boric acid originally employed. If desired, the ingredients may be reacted in amounts which will result in a product of a pH value above that desired so that subsequent adjustment of pH value can be made downwardly with boric acid.

The invention is not to be considered as limited with respect to the pH value of the polycondensation products, nor with respect to the manner of obtaining the desired pH value in said products.

In accordance with the present invention, the foregoing di-, tri-, and tetracondensation products of dulcitol or mannitol, or mixtures thereof, are hydrolyzed to the corresponding monoborate monocondensation products by dissolving the polycondensation products or mixtures thereof in water. In order to induce this hydrolysis, the concentration of the solution is preferably such that the amount of water present is considerably in excess of that theoretically required to convert the di-, tri- or tetra-condensation product to the monoborate monocondensation product. The hydrolysis involves the addition of sufficient water to the polycondensation product to form the corresponding monoborate monocondensation product. The dulcitol and mannitol monoborate monocondensation products are of the empirical formula $C_6H_{13}O_6.B(OH)R$, where R is OH or OM, M being an alkali metal, in which the boron radical replaces the hydrogen atom of a secondary alcohol group of the hexitol.

Thus, the reaction involved in the process of forming mannitol monoborate monocondensation product from mannitol monoborate dicondensation product is as follows:

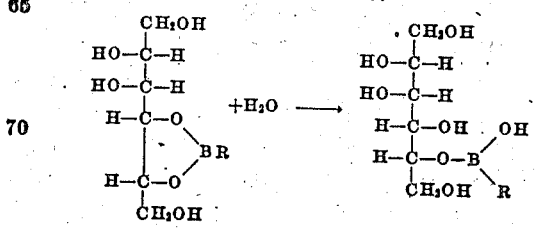

where R is OH or OM, M being an alkali metal.

In the case of mannitol diborate tetracondensation product, the reaction is as follows:

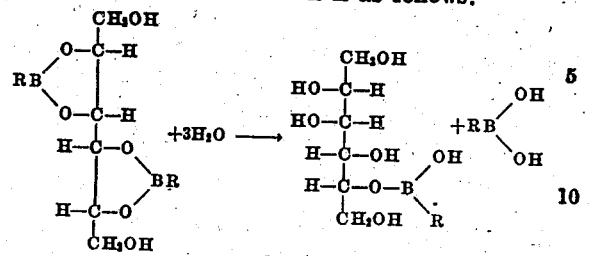

where R is OH or OM, M being an alkali metal.

It is to be understood that hydrolysis of the monoborate dicondensation and diborate tetracondensation products of dulcitol similarly involves the addition of 1 and 3 molecules of water respectively per molecule of the polycondensation products to form dulcitol monoborate monocondensation product.

The hydrolysis of the dulcitol and mannitol tricondensation products involves the addition of 2 molecules of water per molecule of the tricondensation product to form the corresponding monocondensation product in accordance with the following reaction:

$$C_6H_{11}O_6B + 2H_2O \rightarrow C_6H_{13}O_6B(OH)_2$$

Either the non-alkalized or the alkalized polycondensation products, or mixtures thereof, may be used in carrying out the invention with the production of corresponding monoborate monocondensation products. Where the diborate tetracondensation product is employed, the product of the hydrolysis is a mixture of the non-alkalized or alkalized monoborate monocondensation product and orthoboric acid or the alkalized salt thereof, depending upon whether the tetracondensation product was non-alkalized or alkalized.

If it is desired to obtain the non-alkalized monoborate monocondensation product in crystalline form, this may be readily accomplished by hydrolyzing one of the non-alkalized polycondensation products referred to above to form an aqueous solution of the non-alkalized monoborate monocondensation product, and thereafter cooling the solution to 0° C. to cause precipitation of the crystalline non-alkalized monoborate monocondensation product.

Generally, the crystalline non-alkalized monocondensation products may also be obtained by cooling aqueous solutions of a mixture of the alkalized and non-alkalized monoborate monocondensation products obtained in any manner (such as by the hydrolysis and dissolution of a polycondensation product of pH 7) provided that the solution is of a pH below about 10. Precipitation of the non-alkalized monocondensation products from solutions of a mixture of the alkalized and non-alkalized products becomes more difficult as the pH of the solution increases from 2 to 10, probably because of the decreased concentration of the non-alkalized monocondensation product in solutions of high pH.

While, in accordance with the preferred method of obtaining the crystalline product, the hydrolysis is accomplished by dissolving the polycondensation products in water at a temperature of about 75° C., and the separation of the non-alkalized monoborate monocondensation product is effected by cooling the resulting solution down to 0° C. or lower, as for example, to −5° C., it is to be understood that it is within the purview of the invention to utilize other temperatures of dissolution and separation.

While water is generally employed to effect dissolution of the polycondensation products and hydrolysis thereof in accordance with the principles of this invention, the water may be in the form of any aqueous medium which does not prevent the hydrolysis and which does not destroy the hydrolysis product. For example, I have found that 95% acetic acid may be used to advantage.

Below I have given several non-limiting examples of the process of the invention. While these examples set forth specific temperature limits and modes of procedure in making both the polycondensation products and the hydrolytic products, it will be apparent that numerous variations are possible. Thus, in the preparation of the polycondensation products, higher temperatures may be employed provided the time is reduced, or lower temperatures may be used if the time is lengthened. The invention contemplates the conversion of the aforesaid hexahydric alcohol borate polycondensation product to the monocondensation product by hydrolysis as outlined above, regardless of the physical form of the polycondensation product. In certain cases, due to differences in apparatus, and from other considerations, it may be found desirable to depart from the exact conditions set forth in the examples. These and other variations, which will be readily apparent to those skilled in the art, may be made without departing from the spirit of my invention, which is to be construed as limited only by the claims appended hereto.

In the examples, the materials prepared by the reaction of 1 mol of the hexitol and 1 mol of boric acid are designated as monoborates, and those prepared by the reaction of 1 mol of the hexitol and 2 mols of boric acid are designated as diborates. When the material was neutralized or partially neutralized, there is specified the cation used and the pH to which it was adjusted. The polycondensation products are further designated by the terms di-, tri- or tetra-condensation products, depending upon whether 2, 3 or 4 mols of water were lost during the reaction by which they were produced.

Example 1

There was first prepared mannitol monoborate—acidic—dicondensation product, as follows: 182 g. (1 mol) of mannitol and 62 g. (1 mol) of boric acid were dissolved in 180 g. (10 mols) of water. This mixture was heated with agitation at 115–120° C. until the water of solution and 2 mols of water of condensation were given off and the refractive index was about 1.5. The product had a pH of about 2.0 and was a clear, water-white resinous melt.

10 grams of the resinous material thus prepared were dissolved in an equal weight of water by heating a mixture of the resinous material and the water to 70–80° C. Upon cooling the solution, mannitol monoborate monocondensation separated out in small, needle-like crystals. To insure the greatest degree of precipitation, the solution was finally cooled to 0° C. 10 grams of crystalline mannitol monoborate monocondensation product was obtained, by separation from the mother liquor. The product had a melting point of 79–80° C., an empirical formula of $C_6H_{15}O_8$ B and a structural formula as given above. It was stable and could be repeatedly re-crystallized from water.

Example 2

Dulcitol monoborate—acidic—dicondensation product was prepared as follows: 182 g. (1 mol) of dulcitol and 62 g. (1 mol) of boric acid were mixed with 180 g. (10 mols) of water. The mixture was heated with agitation at 115–120° C. for approximately one hour until the refractive index was about 1.5. At this time, not only had the water of solution been driven off, but also 2.0 mols of water of condensation had volatilized. The product had a pH of about 2.0 and was a clear resinous melt which crystallized in 24 hours to crystals having a melting point of 148–150° C.

25 grams of the dulcitol monoborate dicondensation product prepared as above were dissolved in 25 grams of water by heating a mixture of the dicondensation product and the water to a temperature of 75–80° C. Upon cooling the solution, dulcitol monoborate monocondensation product separated out in needle-like crystals. To insure complete precipitation, the solution was cooled to 0° C. The crystals were separated from the mother liquor. The yield was 25 grams of crystalline dulcitol monoborate monocondensation product, having a melting point of 104–108° C. The product had 5 free hydroxyl groups, as determined by the acetin number, while tritylation showed the two primary alcohol groups to be open. Combustion analysis showed it to have an empirical formula of $C_6H_{15}O_8$ B. It is a stable compound and can be re-crystallized from water repeatedly.

Example 3

Mannitol diborate — acidic — tetracondensation product was prepared as follows: 182 g. (1 mol) of mannitol and 124 g. (2 mols) of boric acid were dissolved in 200 g. of water, and the mixture was heated with agitation at 115–120° C. for one hour when it had a refractive index of about 1.48. At the end of this time, not only the water of solution, but also 4.0 mols of water of condensation had been driven off. The product was a clear water-white resinous melt and had a pH of about 2.1.

25 parts by weight of the tetracondensation product thus prepared were dissolved in 75 parts by weight of water at 80° C. The solution was cooled to 10° C. whereupon free boric acid crystallized out. The solution was filtered to remove this boric acid and was cooled to 0° C. whereupon mannitol monoborate monocondensation product, having a melting point of 79–80° C., crystallized out.

Example 4

Dulcitol diborate — acidic — tetracondensation product was prepared as follows: 182 g. (1 mol) of dulcitol and 124 g. (2 mols) of boric acid were dissolved in 270 g. (15 mols) of water and the mixture was heated with agitation at 115–120° C. for one hour, when the product had a refractive index of about 1.48. At the end of this time the water of solution as well as 4.0 mols of water of condensation had volatilized. A clear resin was obtained which solidified on standing 24 hours. The solidified material had a melting point of 275–280° C. Analysis showed the product to have two free hydroxyls, both of which were primary, and to have an empirical formula of $C_6H_{12}O_8B_2$.

25 parts by weight of the dulcitol diborate tetracondensation product thus produced were dissolved in 75 parts by weight of water at 80° C. The solution was cooled to 10° C. at which temperature free boric acid was obtained. Upon further cooling to 0° C., dulcitol monoborate monocondensation product, having a melting point of 104–108° C., crystallized out.

Example 5

36.4 g. (.2 mol) mannitol and 30.8 g. (.2 mol) sodium perborate ($NaBO_3 \cdot 4H_2O$) were mixed with 36.4 g. of water. After warming slightly, oxygen was evolved very rapidly. As soon as this reaction had ceased, the mixture was heated with agitation at 110–115° C. until all water of solution and crystallization as well as 7.2 grams of water of condensation had been volatilized. A clear resin-like melt, which was of a light brown color, was obtained. The product had a pH of 8.8 and about four free hydroxyls as determined by acetin number.

The product prepared as above was dissolved in water whereupon hydrolysis took place, forming a mixture of alkalized and non-alkalized mannitol monoborate monocondensation product. Upon cooling 25–50% aqueous solutions of the product to 0° C. crystallization of the non-alkalized monoborate monocondensation product occurred.

Example 6

The polycondensation product employed in this example was prepared as follows: 182 g. (1 mol) of mannitol and 62 g. (1 mol) of boric acid were dissolved in 180 g. (10 mols) of water. The mixture was heated with agitation at 115–120° C. for approximately one hour until the refractive index was about 1.51. At this time all of the water of solution and approximately 2.4 mols of water of condensation had volatilized. The product had a pH of about 2.0 and was a clear water-white resinous melt. Analysis showed it to contain 60% of the dicondensation product having the structural formula given above and an empirical formula of $C_6H_{13}O_7B$ and 40% of the tricondensation product having the empirical formula $C_6H_{11}O_6B$. Tritylation showed two primary alcohol groups to be open. It had a melting point of 160–167° C.

Two grams of this product were dissolved by heating in 25 ml. of glacial acetic acid to which had been added 1.2 ml. of distilled water. Upon cooling the solution 1.7 g. of crystalline mannitol monoborate monocondensation product having a melting point of 79–80° C. were obtained.

Example 7

10 grams of the mixture of di- and tri-condensation products utilized in Example 6 were dissolved in 10 grams of water by heating to 80° C. Upon cooling to 0° C., 10 g. of crystals of mannitol monoborate monocondensation product having a melting point of 79–80° C. were obtained. This was separated from the mother liquor by filtration.

Example 8

Mannitol monoborate dicondensation product was prepared as follows: 45.5 gms. (0.25 mol) of mannitol and 15.5 gms. (0.25 mol) of $H_3BO_3$ were thoroughly mixed in the cold. The dry mixture was placed in an oven which had a temperature of 130° C. When the temperature of the mixture reached 80° C., the mixture began to melt. At 105° C. water started to volatilize. At 108° C. the mixture had become completely transparent. After maintaining the temperature at 130° C. for five minutes, 9 grams (0.5 mol) of water had been driven off.

15 grams of the material thus prepared were dissolved in 15 grams of water by heating at 75–80° C. Upon cooling to 0° C. 15 grams of mannitol monoborate monocondensation product were obtained.

In its broadest aspect the invention resides in hydrolysis of the polycondensation product to the monocondensation product by $H_2O$ in any form, such as liquid water, water vapor or any aqueous medium capable of effecting hydrolysis in accordance with the equations set out above. In certain of the process claims, by "a temperature at which water is eliminated by ebullition," I mean a temperature at which water is evolved by boiling. Thus, the initial reaction, by which the polycondensation products are formed, takes place at about 105° C. at atmospheric pressure with boiling, or at about 85° C. at 100 mm. pressure with boiling.

In the claims, by the term "boric acid" I mean not only orthoboric acid, but also metaboric acid, perboric acid and other boron acids which contain an OH group attached to the boron, such as tetraboric acid and other polyboric acids. Similarly, by "alkali metal borates," I refer to the salts, not only of orthoboric acid, but also to the salts of perboric acid, metaboric acid, tetraboric acid, and all other alkali metal salts of the boric acids referred to above.

This application is a continuation in part of my co-pending application Serial Number 149,839, filed June 23, 1937, disclosing and claiming Dulcitol and mannitol borates and salts thereof. In this application I claim the method of preparing dulcitol and mannitol monoborate monocondensation products.

Having described my invention, what I claim is:

1. The process of preparing a water soluble derivative of a hexahydric alcohol selected from the group consisting of mannitol and dulcitol, in which the hydrogen atom of one secondary alcohol group has been replaced with the boron radical —B(OH)R, where R is selected from the group consisting of OH and OM, M being an alkali metal, which comprises hydrolyzing a borate polycondensation derivative of the hexahydric alcohol by contacting said derivative with an aqueous medium capable of effecting hydrolysis and which does not destroy the hydrolysis product, said polycondensation derivative consisting of the hexahydric alcohol in which the hydrogen atom of a secondary alcohol group has been replaced by a boron radical selected from the group consisting of —BRR' and —BR'R², where R is selected from the group consisting of OH and OM, M being an alkali metal, R' is a bond to the oxygen atom and replaces the hydrogen atom of a second secondary alcohol group of said hexahydric alcohol and R² is a bond to the oxygen atom and replaces the hydrogen atom of a third alcohol group of said hexahydric alcohol.

2. The process of preparing a water soluble derivative of a hexahydric alcohol selected from the group consisting of mannitol and dulcitol, in which the hydrogen atom of one secondary alcohol group has been replaced with the boron radical —B(OH)R, where R is selected from the group consisting of OH and OM, M being an alkali metal, which comprises hydrolyzing a borate polycondensation derivative of the hexahydric alcohol by dissolving said derivative in an aqueous medium capable of effecting hydrolysis and which does not destroy the hydrolysis product, said polycondensation derivative consisting of the hexahydric alcohol in which the hydrogen atom of a secondary alcohol group has been replaced by a boron radical selected from the group consisting of —BRR′ and —BR′R², where R is selected from the group consisting of OH and OM, M being an alkali metal, R′ is a bond to the oxygen atom and replaces the hydrogen atom of a second secondary alcohol group of said hexahydric alcohol and R² is a bond to the oxygen atom and replaces the hydrogen atom of a third alcohol group of said hexohydric alcohol.

3. The process of preparing a water soluble derivative of a hexahydric alcohol selected from the group consisting of mannitol and dulcitol, in which the hydrogen atom of one secondary alcohol group has been replaced with the boron radical —B(OH)R, where R is selected from the group consisting of OH and OM, M being an alkali metal, which comprises hydrolyzing a borate polycondensation derivative of the hexahydric alcohol by dissolving said derivative in an aqueous medium capable of effecting hydrolysis and which does not destroy the hydrolysis product, said polycondensation derivative consisting of the hexahydric alcohol in which the hydrogen atom of a secondary alcohol group has been replaced with the boron radical —BRR′, where R is selected from the group consisting of OH and OM, M being an alkali metal and R′ is a bond to the oxygen atom and replaces the hydrogen atom of another secondary alcohol group of said hexahydric alcohol.

4. The process of preparing mannitol monoborate monocondensation product of the following formula:

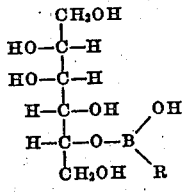

where R is selected from the group consisting of OH and OM, M being an alkali metal, which comprises hydrolyzing mannitol monoborate dicondensation product of the following formula:

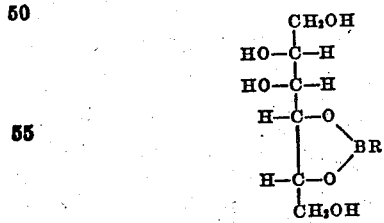

where R is selected from the group consisting of OH and OM, M being an alkali metal, by dissolving the said dicondensation product in an aqueous medium capable of effecting hydrolysis and which does not destroy the hydrolysis product.

5. The process of preparing mannitol monoborate monocondensation product of the following formula:

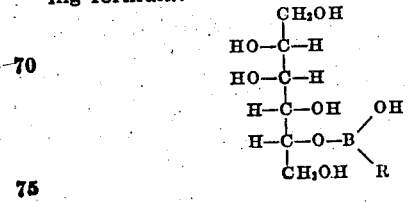

where R is selected from the group consisting of OH and OM, M being an alkali metal, which comprises hydrolyzing mannitol diborate tetracondensation product of the following formula:

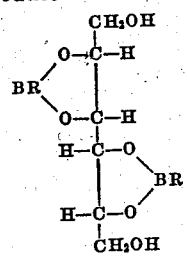

where R is selected from the group consisting of OH and OM, M being an alkali metal, by dissolving the said tetracondensation product in an aqueous medium capable of effecting hydrolysis and which does not destroy the hydrolysis product.

6. The process of preparing a crystalline water soluble monocondensation derivative of a hexahydric alcohol selected from the group consisting of:—mannitol and dulcitol—in which the hydrogen atom of one secondary alcohol group has been replaced with the boron radical —B(OH)₂, which comprises hydrolyzing a water soluble polycondensation derivative of said hexahydric alcohol in which the hydrogen atom of a secondary alcohol group has been replaced with a boron radical selected from that group of radicals represented by —B(OH)R′, —BR′R², where R′ is a bond to the oxygen atom and replaces the hydrogen atom of another secondary group of said hexahydric alcohol, and R² is a bond to the oxygen atom and replaces the hydrogen atom of a third alcohol group of said hexahydric alcohol by dissolving the said polycondensation derivative in water, and cooling the resulting solution to effect separation of said monocondensation derivative in crystalline form.

7. The process of preparing a crystalline water soluble monocondensation derivative of a hexahydric alcohol selected from the group consisting of:—mannitol and dulcitol—in which the hydrogen atom of one secondary alcohol group has been replaced with the boron radical —B(OH)₂, which comprises hydrolyzing a water soluble polycondensation derivative of said hexahydric alcohol in which the hydrogen atom of a secondary alcohol group has been replaced with a boron radical selected from that group of radicals represented by —B(OH)R′; —BR′R², where R′ is a bond to the oxygen atom and replaces the hydrogen atom of another secondary alcohol group of said hexahydric alcohol, and R² is a bond to the oxygen atom and replaces the hydrogen atom of a third alcohol group of said hexahydric alcohol, by dissolving said polycondensation derivative in water at a temperature of approximately 70–80° C., cooling the resulting solution to a temperature of about 0° C. to effect precipitation of said monocondensation derivative in crystalline form, and separating the crystalline product so precipitated.

8. The process of preparing a crystalline water soluble monocondensation derivative of a hexahydric alcohol selected from the group consisting of:—mannitol and dulcitol—in which the hydrogen atom of one secondary alcohol group has been replaced with the boron radical —B(OH)₂, which comprises hydrolyzing a water soluble polycondensation derivative of said hexahydric alcohol in which the hydrogen atom of a secondary alcohol group has been replaced with the boron radical —B(OH)R', where R' is a bond to the oxygen atom and replaces the hydrogen atom of another secondary alcohol group of said hexahydric alcohol, by dissolving said polycondensation derivative in water, and cooling the resulting solution to effect separation of said monocondensation derivative in crystalline form.

9. The process of preparing crystalline mannitol monoborate monocondensation product of the following formula:

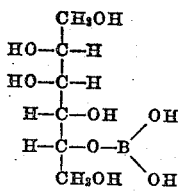

which comprises hydrolyzing mannitol monoborate dicondensation product of the following formula:

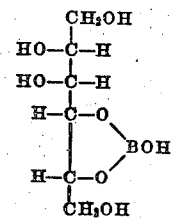

by dissolving the said dicondensation product in water, and cooling the resulting solution to effect separation of said monocondensation product in crystalline form.

10. The process of preparing crystalline mannitol monoborate monocondensation product of the following formula:

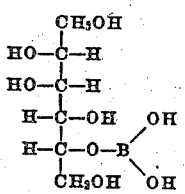

which comprises hydrolyzing mannitol diborate tetracondensation product of the following formula:

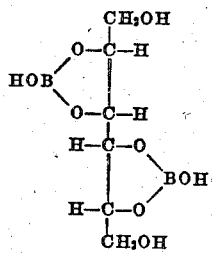

by dissolving the said tetracondensation product in water, and cooling the resulting solution to effect separation of said monocondensation product in crystalline form.

11. The process of preparing a water soluble monocondensation derivative of a hexahydric alcohol selected from the group consisting of:—mannitol and dulcitol—in which the hydrogen atom of one secondary alcohol group has been replaced with the boron radical —B(OH)R, where R is selected from the group consisting of OH and OM, M being an alkali metal, which comprises heating a mixture of the hexahydric alcohol and a boron compound selected from the group consisting of boric acid and alkali metal borates to a temperature at which water is eliminated by ebullition for a sufficient period of time to form a water soluble polycondensation derivative of said hexahydric alcohol in which the hydrogen atom of a secondary alcohol group has been replaced with a boron radical selected from that group of radicals represented by —BRR'; —BR'R², where R is selected from the group consisting of OH and OM, M being an alkali metal, R' is a bond to the oxygen atom and replaces the hydrogen atom of another secondary alcohol group of said hexahydric alcohol, and R² is a bond to the oxygen atom and replaces the hydrogen atom of a third alcohol group of said hexahydric alcohol, and hydrolyzing the polycondensation derivative thus formed to said monocondensation derivative by contacting the said polycondensation derivative with an aqueous medium capable of effecting hydrolysis and which does not destroy the hydrolysis product.

12. The process of preparing a water soluble monocondensation derivatives of a hexahydric alcohol selected from the group consisting of:—mannitol and dulcitol—in which the hydrogen atom of one secondary alcohol group has been replaced with the boron radical —B(OH)R, where R is selected from the group consisting of OH and OM, M being an alkali metal, which comprises heating a mixture of the hexahydric alcohol and a boron compound selected from the group consisting of boric acid and alkali metal borates to a temperature at which water is eliminated by ebullition for a sufficient period of time to form a water soluble polycondensation derivative of said hexahydric alcohol in which the hydrogen atom of a secondary alcohol group has been replaced with a boron radical selected from that group of radicals represented by —BRR'; —BR'R², where R is selected from the group consisting of OH and OM, M being an alkali metal, R' is a bond to the oxygen atom and replaces the hydrogen atom of another secondary alcohol group of said hexahydric alcohol, and R² is a bond to the oxygen atom and replaces the hydrogen atom of a third alcohol group of said hexahydric alcohol and hydrolyzing the polycondensation derivative thus formed to said monocondensation derivative by dissolving the said polycondensation derivative in an aqueous medium capable of effecting hydrolysis and which does not destroy the hydrolysis product.

13. The process of preparing a water soluble monocondensation derivative of a hexahydric alcohol selected from the group consisting of:—mannitol and dulcitol—in which the hydrogen atom of one secondary alcohol group has been replaced with the boron radical —B(OH)R, where R is selected from the group consisting of OH and OM, M being an alkali metal, which comprises heating a mixture of the hexahydric alcohol and a boron compound selected from the group consisting of boric acid and alkali metal borates to a temperature at which water is eliminated by ebullition for a sufficient period of time to form a water soluble polycondensation derivative of said hexahydric alcohol in which the hydrogen atom of a secondary alcohol group has been replaced with the boron radical —BRR', where R is selected from the group consisting of OH and OM, M being an alkali metal, and R' is a bond to the oxygen atom and replaces the hydrogen atom of another secondary alcohol group of said hexahydric alcohol, and hydrolyzing the polycondensation derivative thus formed to said monocondensation derivative by dissolving the said polycondensation derivative in an aqueous medium capable of effecting hydrolysis and which does not destroy the hydrolysis product.

14. The process of preparing mannitol monoborate monocondensation product of the following formula:

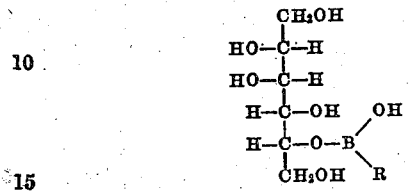

where R is selected from the group consisting of OH and OM, M being an alkali metal, which comprises heating a mixture comprising mannitol and a boron compound selected from the group consisting of boric acid and alkali metal borates in the proportion of one mol of mannitol to one mol of boron present in the reacting mixture, to a temperature at which water is eliminated by ebullition for a sufficient period of time to form mannitol monoborate dicondensation product of the following formula:

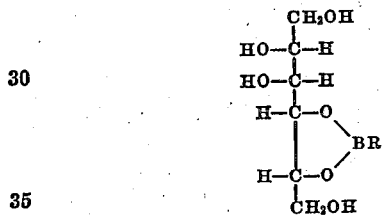

where R is selected from the group consisting of OH and OM, M being an alkali metal, and hydrolyzing the dicondensation product thus formed to said monocondensation product by dissolving the said dicondensation product in an aqueous medium capable of effecting hydrolysis and which does not destroy the hydrolysis product.

15. The process of preparing mannitol monoborate monocondensation product of the following formula:

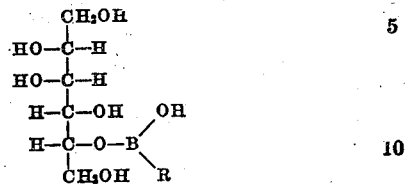

where R is selected from the group consisting of OH and OM, M being an alkali metal, which comprises heating a mixture comprising mannitol and a boron compound selected from the group consisting of boric acid and alkali metal borates, in the proportion of one mol of mannitol to two mols of boron present in the reacting mixture, to a temperature at which water is eliminated by ebullition for a sufficient period of time to form mannitol diborate tetracondensation product of the following formula:

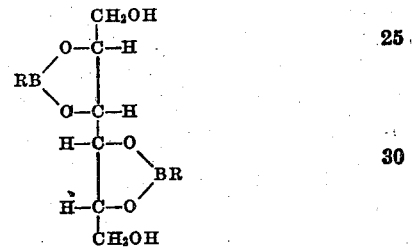

where R is selected from the group consisting of OH and OM, M being an alkali metal, and hydrolyzing the tetracondensation product thus formed to said monocondensation product by dissolving said tetracondensation product in an aqueous medium capable of effecting hydrolysis and which does not destroy the hydrolysis product.

CLARENCE BREMER.